(12) United States Patent
Wang

(10) Patent No.: US 12,343,663 B2
(45) Date of Patent: Jul. 1, 2025

(54) FISH POND FILTRATION DEVICE

(71) Applicant: Haibo Wang, Hengyang (CN)

(72) Inventor: Haibo Wang, Hengyang (CN)

( * ) Notice: Subject to any disclaimer, the term of this patent is extended or adjusted under 35 U.S.C. 154(b) by 438 days.

(21) Appl. No.: 18/072,753

(22) Filed: Dec. 1, 2022

(65) Prior Publication Data

US 2023/0211262 A1 Jul. 6, 2023

(30) Foreign Application Priority Data

Jan. 6, 2022 (CN) .......................... 202220017973.6

(51) Int. Cl.
| | | |
|---|---|---|
| *B01D 33/50* | (2006.01) | |
| *A01K 63/04* | (2006.01) | |
| *B01D 33/11* | (2006.01) | |
| *B01D 36/04* | (2006.01) | |

(52) U.S. Cl.
CPC .............. *B01D 33/50* (2013.01); *A01K 63/04* (2013.01); *B01D 33/11* (2013.01); *B01D 33/503* (2013.01); *B01D 36/04* (2013.01)

(58) Field of Classification Search
CPC ...... B01D 33/50; B01D 33/11; B01D 33/503; B01D 36/04; A01K 63/04
USPC ........... 210/153, 167.21, 170.02, 360.1, 369, 210/380.3, 391; 119/226, 227, 228
See application file for complete search history.

(56) References Cited

FOREIGN PATENT DOCUMENTS

| | | | | |
|---|---|---|---|---|
| CN | 205182325 U | * | 4/2016 | |
| CN | 207628044 U | * | 7/2018 | |
| CN | 212214816 U | * | 12/2020 | |
| FR | 2746032 A1 | * | 9/1997 | ........... B01D 33/067 |
| GB | 2235482 A | * | 3/1991 | ................ E02F 3/88 |

OTHER PUBLICATIONS

Machine-generated English translation of CN 205182325, generated on Mar. 31, 2025.*
Machine-generated English translation of CN 207628044, generated on Mar. 31, 2025.*
Machine-generated English translation of CN 212214816, generated on Mar. 31, 2025.*
Machine-generated English translation of FR 2746032, generated on Mar. 31, 2025.*

* cited by examiner

*Primary Examiner* — Fred Prince
(74) *Attorney, Agent, or Firm* — Bayramoglu Law Offices LLC

(57) ABSTRACT

A fish pond filtration device includes a filter tank, a conical filter cylinder, a garbage collection trough, and a sewage pipe; the conical filter cylinder, the garbage collection trough and the sewage pipe are located in the filter tank; water discharge ports are provided in a bottom or a side wall of the filter tank, and the conical filter cylinder is in rotary fit with the filter tank; the garbage collection trough is disposed below a large-diameter end of the conical filter cylinder, a filter port and a sewage discharge port are provided in a bottom of the garbage collection trough, and the sewage discharge port communicates into a sedimentation barrel; and a water pump is disposed at one end of the sewage pipe, the water pump is located in a fish pond, and the other end of the sewage pipe extends into the conical filter cylinder.

9 Claims, 4 Drawing Sheets

FISH POND FILTRATION DEVICE

CROSS REFERENCE TO THE RELATED APPLICATIONS

This application is based upon and claims priority to Chinese Patent Application No. 202220017973.6, filed on Jan. 6, 2022, the entire contents of which are incorporated herein by reference.

TECHNICAL FIELD

The present invention relates to the field of filtration apparatuses, in particular to a fish pond filtration device.

BACKGROUND

After farming fish in a fish pond for a long time, various kinds of garbage impurities may be produced, which, if not removed in time, may crowd the space in the fish pond on the one hand, and may pollute water and affect the growth of fish on the other hand.

SUMMARY

In order to solve the above technical problems, the present invention provides a fish pond filtration device. By means of the fish pond filtration device, sewage can be dynamically filtered, accumulation of garbage impurities can be effectively avoided due to continuous rotation of a conical filter cylinder in a washing process, and the usage rate of a filtration part of the conical filter cylinder is improved; in addition, a backwashing device is adopted, and drives the conical filter cylinder to rotate through washing, such that the conical filter cylinder can be completely washed and cleaned, and the service life is prolonged; and the effect of water filtration can be significantly improved through three-step filtration of the conical filter cylinder, a garbage collection trough, and a sedimentation barrel.

In order to solve the technical problems, the present invention adopts the following technical solution: a fish pond filtration device includes a filter tank, a conical filter cylinder, a garbage collection trough, and a sewage pipe;

the conical filter cylinder, the garbage collection trough and the sewage pipe are located in the filter tank;

water discharge ports are provided in a bottom or a side wall of the filter tank, and the conical filter cylinder is in rotary fit with the filter tank;

a large-diameter end of the conical filter cylinder is open, the garbage collection trough is disposed below the large-diameter end of the conical filter cylinder, a filter port and a sewage discharge port are provided in a bottom of the garbage collection trough, and the sewage discharge port communicates into a sedimentation barrel; and a water pump is disposed at one end of the sewage pipe, the water pump is located in a fish pond, the other end of the sewage pipe extends into the conical filter cylinder, and water outlets of the sewage pipe point to an inner wall of the conical filter cylinder.

Water in the fish pond is filtered according to the following steps:

Step 1, the water in the fish pond flows towards the inner wall of the conical filter cylinder through the sewage pipe, and is initially filtered through the side wall of the conical filter cylinder; since the conical filter cylinder is disposed in the filter tank in a rotary fit manner, the conical filter cylinder rotates continuously while the inner wall of the conical filter cylinder is washed with the water, and washing positions of the water outlets of the sewage pipe change continuously due to rotation of the conical filter cylinder, such that garbage impurities may not accumulate in the same place for a long time, the conical filter cylinder may be utilized more efficiently, and the filtration effect is better; and the water is discharged from the water discharge ports of the filter tank for further use.

Step 2, garbage inside the conical filter cylinder is continuously thrown out of a cylinder opening due to centrifugal force generated by the rotating conical filter cylinder, and enters the garbage collection trough, to avoid excessive accumulation in the conical filter cylinder, garbage impurities and part of the water enter the garbage collection trough, the garbage impurities enter the sedimentation barrel via the sewage discharge port, and the part of water enters the filter tank via the filter port.

Step 3, the garbage impurities are collected in the garbage collection trough and sediment, and water obtained after sedimentation is also collected.

Preferably, the water discharge ports are filter holes provided in the bottom of the filter tank. Thus, water may be filtered secondarily to avoid entry of other garbage.

Preferably, the sewage pipe is fixed to the filter tank, an end of the sewage pipe extends into the conical filter cylinder via a circle center of a small-diameter end of the conical filter cylinder, and the sewage pipe is in rotary fit with the small-diameter end of the conical filter cylinder. Since the sewage pipe extends into the conical filter cylinder via the circle center of the small-diameter end, and at the same time, the sewage pipe is in rotary fit with the conical filter cylinder, the sewage pipe may be supported while allowing water to extend into the conical filter cylinder.

Preferably, a support is disposed at the large-diameter end of the conical filter cylinder, the support is provided with a mandrel outwards, and the mandrel is in rotary fit with the filter tank, thus providing support for the conical filter cylinder.

Preferably, a filter screen is disposed on a side wall of the conical filter cylinder and/or at the filter port. The filtration effect may be further improved by means of the filter screen.

Preferably, the sewage discharge port communicates to the sedimentation barrel, thus facilitating centralized collection and disposal of garbage impurities.

Preferably, a backwashing device is disposed outside the conical filter cylinder. Thus, the conical filter cylinder is cleaned more conveniently for repeated use, and the service life of the conical filter cylinder is prolonged.

Preferably, the backwashing device includes a washing pipe and nozzles communicating with the washing pipe, and the nozzles point to an outer wall of the conical filter cylinder. By washing the outer wall of the conical filter cylinder through the plurality of nozzles, on the one hand, the cleaning coverage may be extended, and on the other hand, the conical filter cylinder may be driven to rotate automatically, so as to be completely cleaned, and cleaning is more thorough.

Preferably, the nozzles are of a flat mouth structure. Thus, the cleaning range may be extended.

The present invention has the beneficial effects:

With the solution, sewage can be dynamically filtered, accumulation of garbage impurities can be effectively avoided due to continuous rotation of the conical filter cylinder in the washing process, and the usage rate of the filtration part of the conical filter cylinder is improved; garbage impurities produced after filtering can be collected in a centralized manner to avoid secondary pollution; and in addition, the backwashing device is adopted, and drives the conical filter cylinder to rotate through washing, such that the conical filter cylinder can be completely washed and cleaned, and the service life is prolonged. The effect of water filtration can be significantly improved through three-step filtration of the conical filter cylinder, the garbage collection trough, and the sedimentation barrel.

BRIEF DESCRIPTION OF THE DRAWINGS

For clearer descriptions of the technical solutions according to the embodiments of the present invention or in the prior art, drawings that are to be referred for description of the embodiments are briefly described hereinafter. Apparently, the drawings described hereinafter merely illustrate four of the present invention, and persons of ordinary skill in the art may also derive other drawings based on the drawings described herein without any creative effort.

1. Filter tank, 2. Conical filter cylinder, 3. Sewage pipe, 4. Washing pipe, 5. Nozzle, 6. Support, 7. Mandrel, 8. Garbage collection trough, 9. Filter port, 10. Sewage discharge port, 11. Water discharge port, 12. Fish pond, 13. Water pump, 14. Sedimentation barrel, and 15. Clean water collection position.

DETAILED DESCRIPTION OF THE EMBODIMENTS

In order to deepen the understanding of the present invention, the present invention will be described in further detail below with reference to the accompanying drawings and an embodiment. The embodiment is merely used to explain the present invention and does not constitute a limitation to the scope of protection of the present invention.

EMBODIMENT

Figure 1:
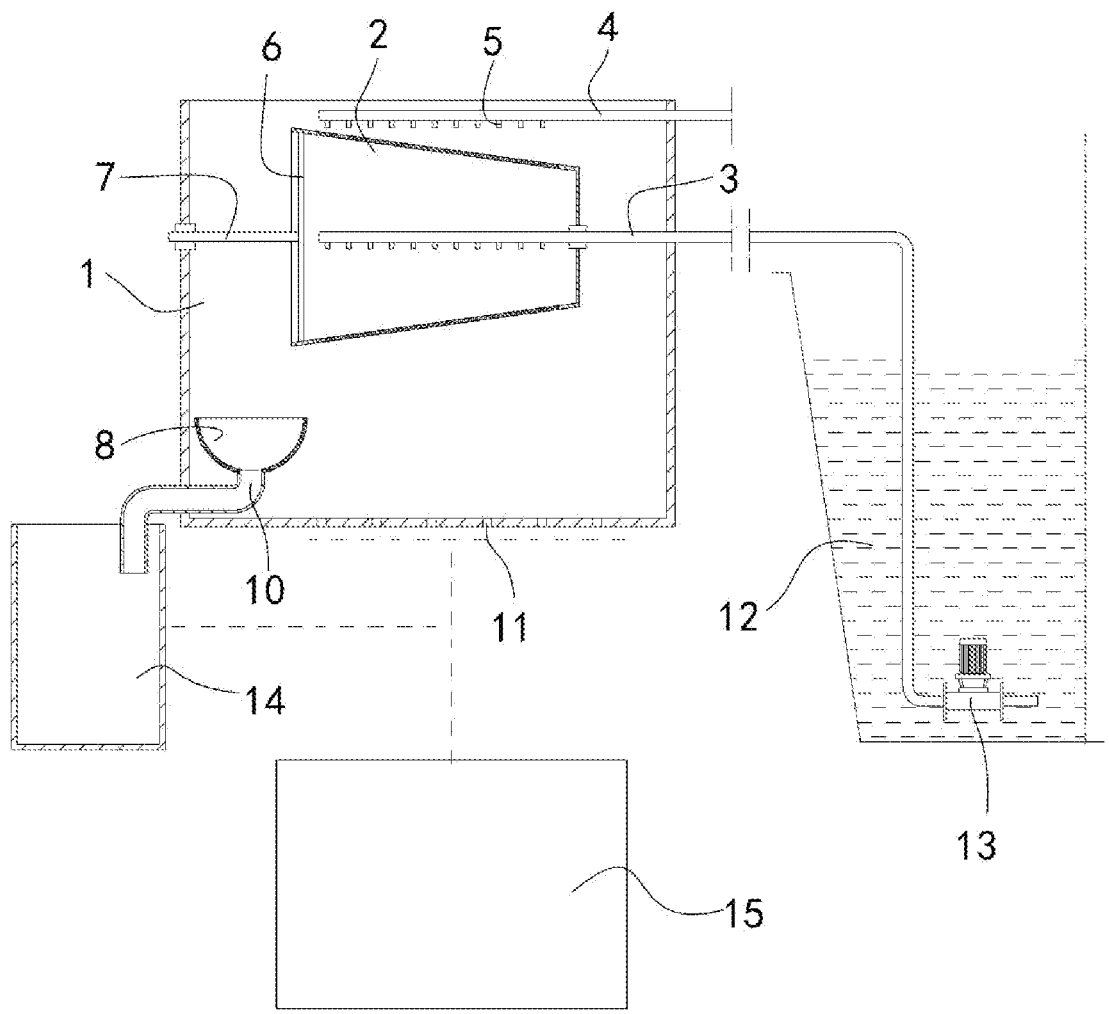
FIG. 1 is a schematic diagram of an embodiment of the present invention.
Figure 2:
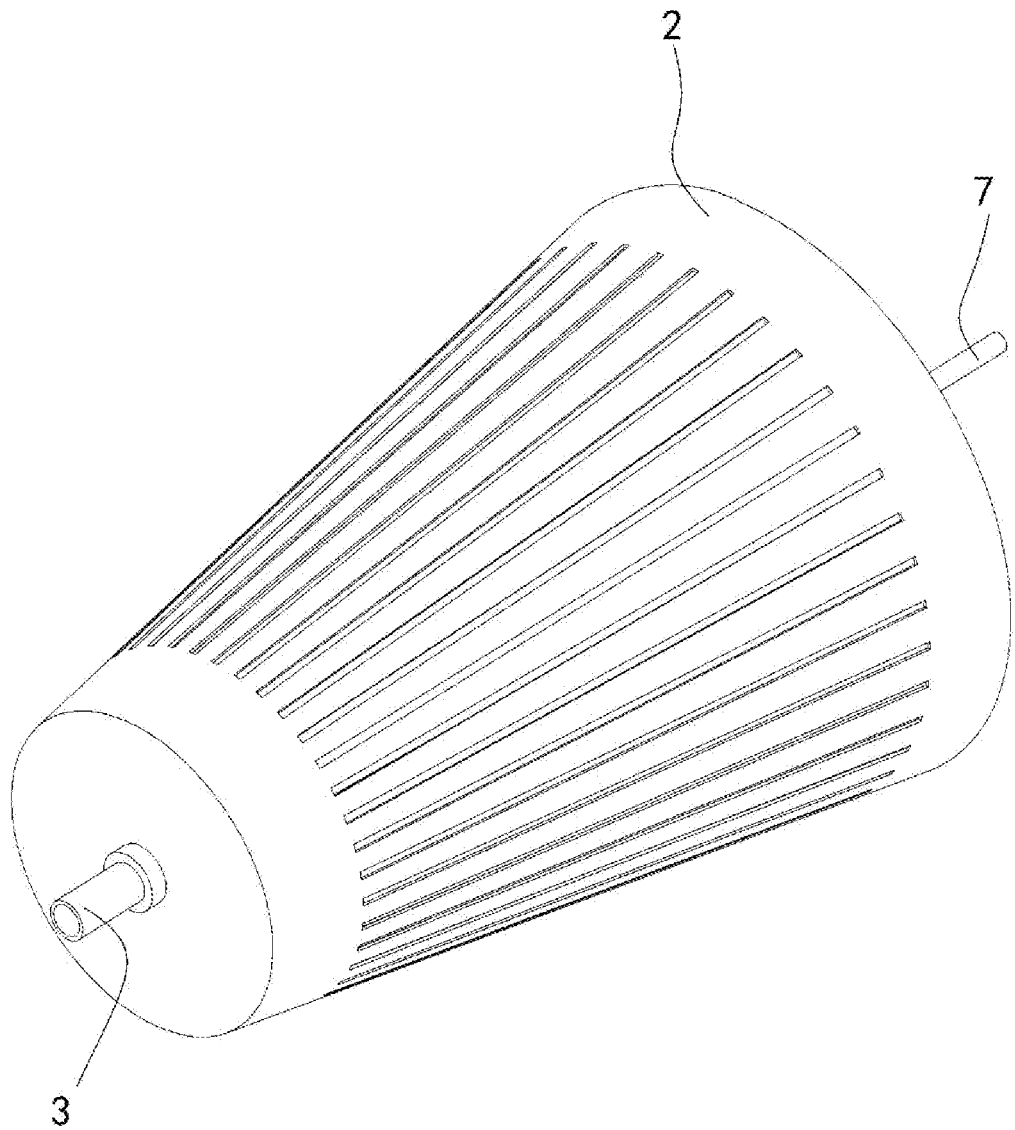
FIG. 2 is a rear three-dimensional view of a conical filter cylinder according to an embodiment of the present invention.
Figure 3:
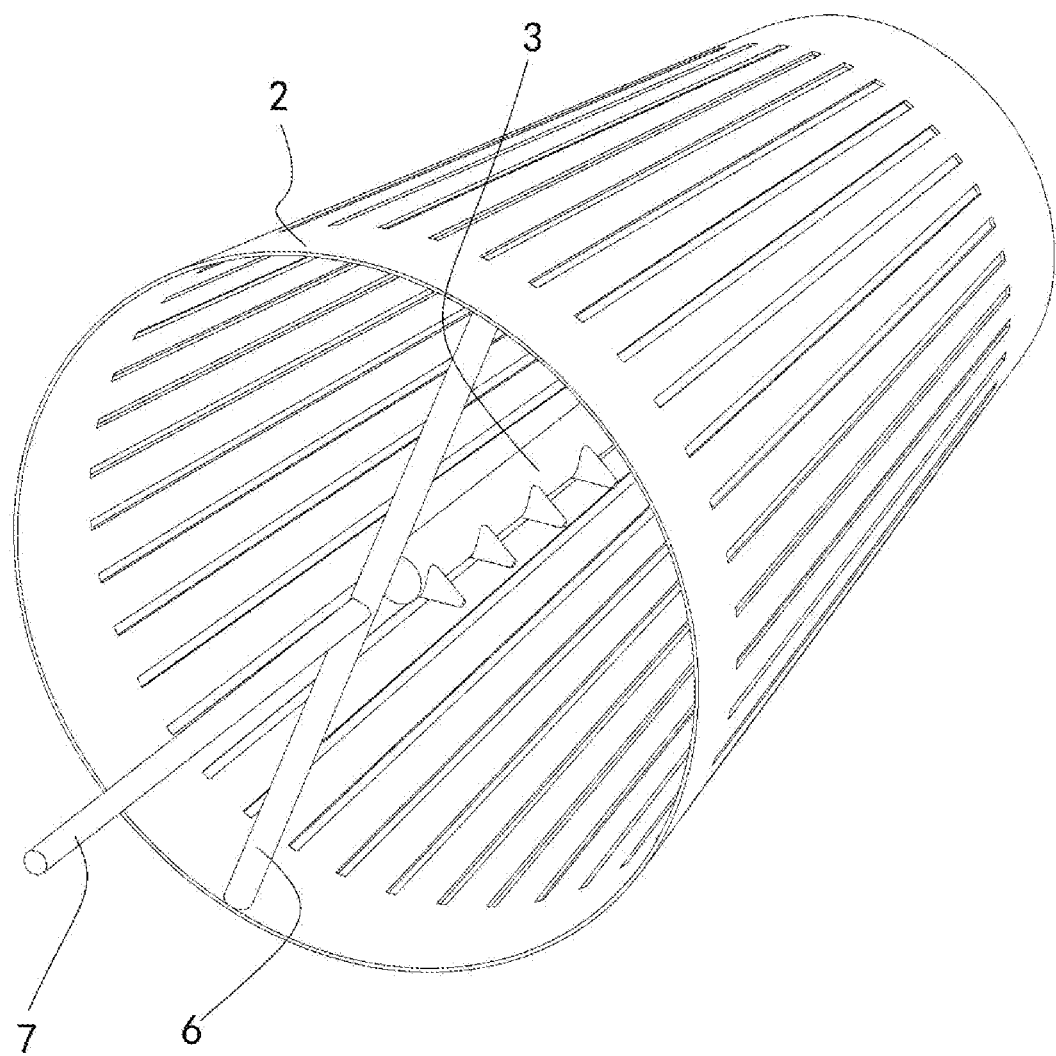
FIG. 3 is a front three-dimensional view of a conical filter cylinder according to an embodiment of the present invention.

As shown in FIG. 1, a fish pond filtration device includes a filter tank 1, a conical filter cylinder 2, a garbage collection trough 8, and a sewage pipe 3. Referring to FIG. 2 and FIG. 3, the conical filter cylinder 2, the garbage collection trough 8 and the sewage pipe 3 are located in the filter tank 1. Water discharge ports 11 are provided in a bottom of the filter tank 1. The conical filter cylinder 2 is in rotary fit with the filter tank 1.

Figure 4:
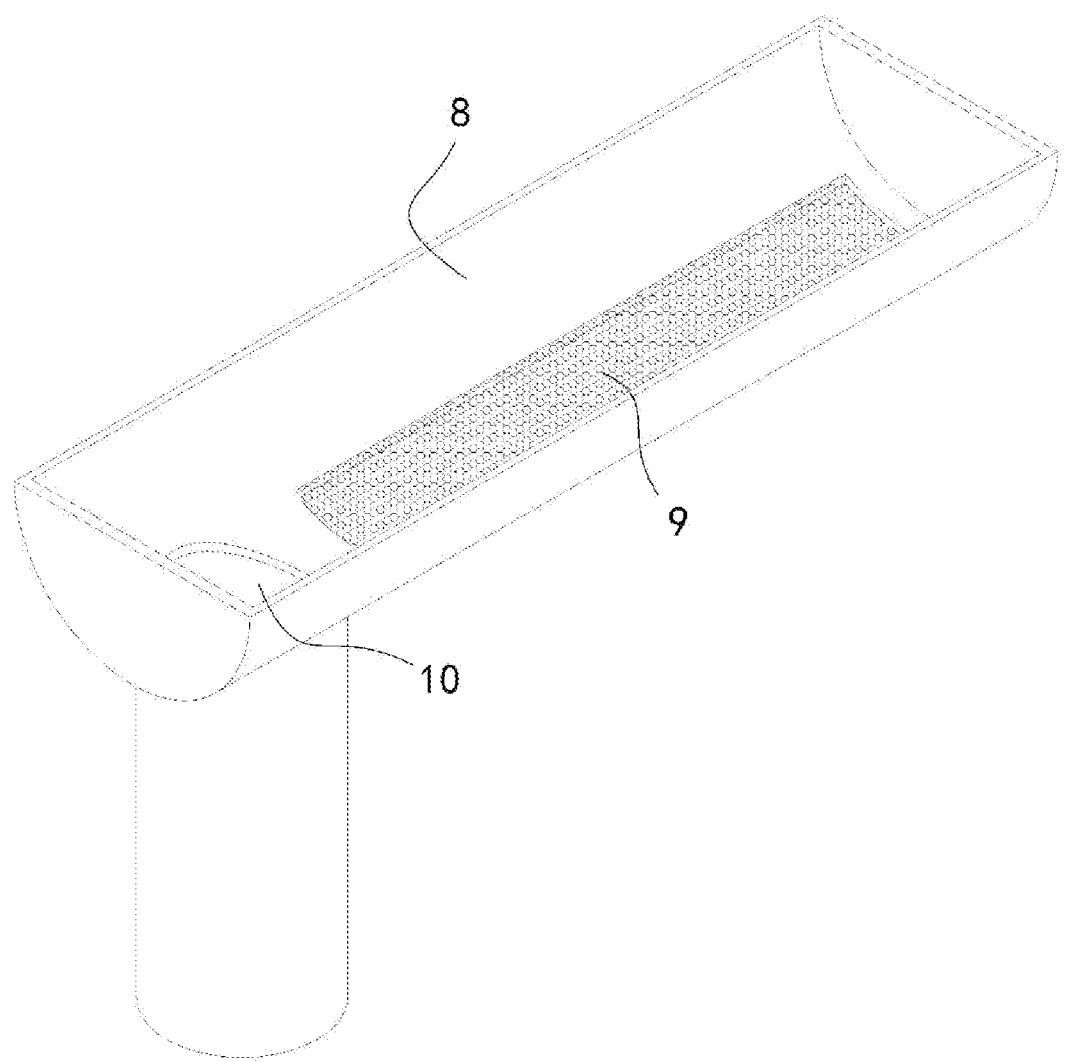
FIG. 4 is a schematic diagram of a garbage collection trough according to an embodiment of the present invention.

A large-diameter end of the conical filter cylinder 2 is open. The garbage collection trough 8 is disposed below the large-diameter end of the conical filter cylinder 2. Referring to FIG. 4, a filter port 9 and a sewage discharge port 10 are provided in a bottom of the garbage collection trough 8, and the sewage discharge port 10 communicates into a sedimentation barrel 14.

A water pump 13 is disposed at one end of the sewage pipe 3. The water pump 13 is located in a fish pond 12. The other end of the sewage pipe 3 extends into the conical filter cylinder 2. Water outlets of the sewage pipe 3 point to an inner wall of the conical filter cylinder 2. In this embodiment, the sewage pipe 3 is provided with at least one water outlet to extend the coverage.

Step 1, water in the fish pond flows towards the inner wall of the conical filter cylinder through the sewage pipe, and is initially filtered through the side wall of the conical filter cylinder; since the conical filter cylinder is disposed in the filter tank in a rotary fit manner, the conical filter cylinder rotates continuously while the inner wall of the conical filter cylinder is washed with the water, and washing positions of the water outlets of the sewage pipe change continuously due to rotation of the conical filter cylinder, such that garbage impurities may not accumulate in the same place for a long time, the conical filter cylinder may be utilized more efficiently, and the filtration effect is better; and the water is discharged from the water discharge ports of the filter tank for further use.

Step 2, garbage inside the conical filter cylinder is continuously thrown out of a cylinder opening due to centrifugal force generated by the rotating conical filter cylinder, and enters the garbage collection trough, to avoid excessive accumulation in the conical filter cylinder, garbage impurities and part of the water enter the garbage collection trough, the garbage impurities enter the sedimentation barrel via the sewage discharge port, and the part of water enters the filter tank via the filter port.

Step 3, the garbage impurities are collected in the garbage collection trough and sediment, and water obtained after sedimentation is also collected.

In this solution, water from the garbage collection trough 8 is filtered and then enters the filter tank 1, and then enters a clean water collection position 15 together with settled water in the sedimentation barrel 14.

The water discharge ports 11 are filter holes provided in the bottom of the filter tank 1. Thus, water may be filtered secondarily to avoid entry of other garbage.

The sewage pipe 3 is fixed to the filter tank 1. An end of the sewage pipe 3 extends into the conical filter cylinder 2 via a circle center of a small-diameter end of the conical filter cylinder. The sewage pipe 3 is in rotary fit with the small-diameter end of the conical filter cylinder 2. Since the sewage pipe 3 extends into the conical filter cylinder via the circle center of the small-diameter end, and at the same time, the sewage pipe is in rotary fit with the conical filter cylinder, the sewage pipe 3 may be supported while allowing water to extend into the conical filter cylinder 2.

A support 6 is disposed at the large-diameter end of the conical filter cylinder 2, the support 6 is provided with a mandrel 7 outwards, and the mandrel 7 is in rotary fit with the filter tank 1, thus providing support for the conical filter cylinder.

A filter screen is disposed on the side wall of the conical filter cylinder 2 and/or at the filter port 9. The filtration effect may be further improved by means of the filter screen.

The sewage discharge port 10 communicates to the sedimentation barrel, thus facilitating centralized collection and disposal of garbage impurities.

A backwashing device is disposed outside the conical filter cylinder 2. Thus, the conical filter cylinder is cleaned more conveniently for repeated use, and the service life of the conical filter cylinder 2 is prolonged.

The backwashing device includes a washing pipe 4 and nozzles 5 communicating with the washing pipe 4. The nozzles 5 point to an outer wall of the conical filter cylinder 2. By washing the outer wall of the conical filter cylinder 2 through the plurality of nozzles 5, on the one hand, the cleaning coverage may be extended, and on the other hand, the conical filter cylinder 2 may be driven to rotate automatically, so as to be completely cleaned, and cleaning is more thorough.

The nozzles 5 are of a flat mouth structure. Thus, the cleaning range may be extended.

With the solution, sewage can be dynamically filtered, accumulation of garbage impurities can be effectively avoided due to continuous rotation of the conical filter cylinder 2 in the washing process, and the usage rate of a filtration part of the conical filter cylinder 2 is improved; garbage impurities produced after filtering can be collected in a centralized manner to avoid secondary pollution; and in addition, the backwashing device is adopted, and drives the conical filter cylinder 2 to rotate through washing, such that the conical filter cylinder 2 can be completely washed and cleaned, and the service life is prolonged.

In this solution, the water outlets of the sewage pipe 3 and the nozzles 5 of the washing pipe 4 are preferably at an angle tangent to the side wall of the conical filter cylinder 2 in order to better drive the conical filter cylinder 2 to rotate.

Sewage enters the conical filter cylinder 2 through the sewage pipe 3, and washes and cleans the side wall of the conical filter cylinder based on impact force, so as to drive the conical filter cylinder to rotate by 360 degrees. The inner wall of the conical filter cylinder 2 is washed while rotary filtration is performed, such that garbage attached to the inner wall of the conical filter cylinder 2 is washed away into the garbage collection trough 8 due to rotary washing of the sewage. Secondary sedimentation filtering and garbage separation are performed through the filter port 9 in the bottom inside the garbage collection trough, garbage separated out is discharged into the sedimentation barrel 14 via the sewage discharge port 10, and garbage in the sedimentation barrel 14 is collected for the third time through precipitation separation to be recycled.

The technical solution has the following advantages:
1. The power of a whole circulating filtration system merely comes from washing with sewage extracted by the water pump 13 in a sewage pond.
2. The whole circulating filtration device achieves energy saving and emission reduction, fully embodies the design idea of simplification, and simplifies the complex filtration process.
3. The whole circulating filtration system minimizes wasted water resources for sewage treatment.
4. Compared with existing filtration devices on the market, the whole circulating filtration device greatly simplifies and optimizes all installation and operation processes, thus making fish farming simpler.
5. The manufacturing cost is greatly reduced, the manufacturing time is greatly shortened, the overall failure rate is quite low, and cleaning and maintenance are easier.
6. The rotation power of the conical filter cylinder comes from washing power of water in the sewage pipe and the washing pipe, without other power, such that more energy is saved, and environmental friendliness is higher. Water for filtration and backwashing can be filtered for reuse, thus saving more water.

The above embodiment should not be construed as limiting the present invention in any manner, and all technical solutions obtained by means of equivalent substitution or equivalent conversion fall within the scope of protection of the present invention.

The invention claimed is:

1. A fish pond filtration device, comprising a filter tank, a conical filter cylinder, a garbage collection trough, and a sewage pipe, wherein
   the conical filter cylinder, the garbage collection trough and the sewage pipe are located in the filter tank;
   water discharge ports are provided in a bottom or a side wall of the filter tank, and the conical filter cylinder is in rotary fit with the filter tank;
   a large-diameter end of the conical filter cylinder is open, the garbage collection trough is disposed below the large-diameter end of the conical filter cylinder, a filter port and a sewage discharge port are provided in a bottom of the garbage collection trough, and the sewage discharge port communicates into a sedimentation barrel; and
   a water pump is disposed at a first end of the sewage pipe, the water pump is located in a fish pond, a second end of the sewage pipe extends into the conical filter cylinder, and water outlets of the sewage pipe point to an inner wall of the conical filter cylinder.

2. The fish pond filtration device according to claim 1, wherein the water discharge ports are filter holes provided in the bottom of the filter tank.

3. The fish pond filtration device according to claim 1, wherein the sewage pipe is fixed to the filter tank, an end of the sewage pipe extends into the conical filter cylinder via a circle center of a small-diameter end of the conical filter cylinder, and the sewage pipe is in rotary fit with the small-diameter end of the conical filter cylinder.

4. The fish pond filtration device according to claim 1, wherein a support is disposed at the large-diameter end of the conical filter cylinder, the support is provided with a mandrel outwards, and the mandrel is in rotary fit with the filter tank.

5. The fish pond filtration device according to claim 1, wherein a filter screen is disposed on a side wall of the conical filter cylinder and/or at the filter port.

6. The fish pond filtration device according to claim 1, wherein the sewage discharge port communicates to the sedimentation barrel.

7. The fish pond filtration device according to claim 1, wherein a backwashing device is disposed outside the conical filter cylinder.

8. The fish pond filtration device according to claim 7, wherein the backwashing device comprises a washing pipe and nozzles communicating with the washing pipe, and the nozzles point to an outer wall of the conical filter cylinder.

9. The fish pond filtration device according to claim 8, wherein the nozzles are of a flat mouth structure.

* * * * *